US009354991B2

(12) United States Patent
Bennett et al.

(10) Patent No.: US 9,354,991 B2
(45) Date of Patent: May 31, 2016

(54) LOCALLY GENERATED SIMPLE ERASURE CODES

(71) Applicant: Microsoft Corporation, Redmond, WA (US)

(72) Inventors: John G. Bennett, Clyde Hill, WA (US); Bob Jenkins, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 316 days.

(21) Appl. No.: 13/927,061

(22) Filed: Jun. 25, 2013

(65) Prior Publication Data

US 2014/0380088 A1 Dec. 25, 2014

(51) Int. Cl.
*G06F 11/00* (2006.01)
*G06F 11/16* (2006.01)
*G06F 11/20* (2006.01)
*G06F 11/10* (2006.01)

(52) U.S. Cl.
CPC ........ *G06F 11/1666* (2013.01); *G06F 11/1096* (2013.01); *G06F 11/1662* (2013.01); *G06F 11/2058* (2013.01); *G06F 11/2094* (2013.01)

(58) Field of Classification Search
CPC ............ H03M 13/1191; H03M 13/15; H03M 13/1515; H03M 13/27; H03M 13/2906; H03M 13/373
USPC ........................... 714/795, 752, 755; 375/262
See application file for complete search history.

(56) References Cited

U.S. PATENT DOCUMENTS

| 7,546,342 | B2 | 6/2009 | Li et al. |
| 7,581,156 | B2 | 8/2009 | Manasse |
| 7,904,782 | B2 | 3/2011 | Huang et al. |
| 7,930,611 | B2 | 4/2011 | Huang et al. |
| 8,051,362 | B2 | 11/2011 | Li et al. |

(Continued)

OTHER PUBLICATIONS

Huang, et al., "Erasure Coding in Windows Azure Storage", Retrieved at <<http://research.microsoft.com/pubs/179583/LRC12-cheng%20webpage.pdf>>, in USENIX Conference on Annual Technical Conference, Jun. 2012, pp. 12.

(Continued)

*Primary Examiner* — Bryce Bonzo
*Assistant Examiner* — Jeison C Arcos
(74) *Attorney, Agent, or Firm* — Henry Gabryjelski; Kate Drakos; Micky Minhas

(57) ABSTRACT

An "erasure code" is an encoding of multiple different sets of data. Redundant copies of data are maintained in such erasure codes, thereby utilizing only a fraction of the storage capacity of unencoded copies. Erasure codes are efficiently generated, with a minimum of processing resources utilizing XOR functionality. Additionally, erasure codes are generated from local data, thereby avoiding the consumption of network resources. At least one unencoded copy of a set of data is maintained, while the remaining, redundant copies are encoded into erasure codes. Requests for data are provided from the unencoded copy. Should it fail, a new unencoded copy can be generated by another computing device having access to both an erasure code as well as unencoded copies of the other data that was also pressed into that erasure code. Multiple failures can be survived through recursive application of such a decoding of encoded data.

20 Claims, 8 Drawing Sheets

(56) References Cited

U.S. PATENT DOCUMENTS

| | | | |
|---|---|---|---|
| 8,296,515 B1 | 10/2012 | Saxena et al. | |
| 8,683,153 B1* | 3/2014 | Long et al. | 711/162 |
| 2004/0078654 A1* | 4/2004 | Holland et al. | 714/13 |
| 2004/0254964 A1* | 12/2004 | Kodama et al. | 707/204 |
| 2007/0136525 A1 | 6/2007 | Read | |
| 2008/0183963 A1 | 7/2008 | He et al. | |
| 2008/0222480 A1* | 9/2008 | Huang et al. | 714/752 |
| 2008/0222481 A1* | 9/2008 | Huang et al. | 714/752 |
| 2008/0313241 A1* | 12/2008 | Li et al. | 707/202 |
| 2010/0218037 A1 | 8/2010 | Swartz et al. | |
| 2010/0235677 A1 | 9/2010 | Wylie et al. | |
| 2011/0029840 A1 | 2/2011 | Ozzie et al. | |
| 2011/0225474 A1 | 9/2011 | Theis et al. | |
| 2012/0060072 A1* | 3/2012 | Simitci et al. | 714/756 |
| 2012/0110346 A1* | 5/2012 | Resch | 713/189 |
| 2012/0246547 A1 | 9/2012 | Yekhanin et al. | |
| 2013/0054549 A1 | 2/2013 | Gopalan et al. | |
| 2013/0275381 A1* | 10/2013 | De Schrijvr et al. | 707/652 |
| 2013/0339818 A1* | 12/2013 | Baker | G06F 11/10 714/763 |

OTHER PUBLICATIONS

Pamies-Juarez, et al., "In-Network Redundancy Generation for Opportunistic Speed up of Data Backup", Retrieved at <<http://arxiv.org/pdf/1111.4533.pdf>>, in Journal of Future Generation Computer Systems, vol. 29, Issue 6, Feb. 20, 2013, pp. 20.

"Coding for Networked Storage Systems", Retrieved at <<http://sands.sce.ntu.edu.sg/CodingForNetworkedStorage/#>>, Retrieved Date: Apr. 25, 2013, pp. 11.

Sathiamoorthy, et al., "XORing Elephants: Novel Erasure Codes for Big Data", <<http://arxiv.org/pdf/1301.3791v1.pdf>>, in CoRR, Jan. 16, 2013, pp. 16.

Rawat, et al., "Optimal Locally Repairable and Secure Codes for Distributed Storage Systems", Retrieved at <<http://arxiv.org/pdf/1210.6954.pdf>>, in arXiv Preprint, arXiv:1210.6954, Oct. 25, 2012, pp. 18.

"Local Erasure Codes for Data Storage", U.S. Appl. No. 13/863,912, filed Apr. 16, 2013, pp. 46.

International Search Report and Written Opinion Issued in PCT Application No. PCT/US2014/043551, Mailed Date: Dec. 3, 2014, 9 Pages.

* cited by examiner

LOCALLY GENERATED SIMPLE ERASURE CODES

BACKGROUND

Modern server computing devices are often physically configured in a manner to promote the installation and maintenance of multiple such server computing devices within a confined space, such as a rack. Multiple racks of server computing devices can then be housed in a dedicated facility, commonly referred to as a "data center". By aggregating computing resources together, datacenters can provide efficiencies of scale while simultaneously providing increased computational ability and availability. For example, datacenters can comprise thousands of computing devices whose combined processing capabilities can be divided and shared in a myriad of ways, thereby enabling entities to access a far greater amount of processing capability, for less cost, than if such entities were to purchase the computing devices themselves. As another example, datacenters can implement redundancy mechanisms that can be prohibitively expensive on individual basis, but can provide inexpensive risk reduction when their cost is spread out across all of the users of a data center. Such redundancy mechanisms can include the partitioning of computing devices, within the data center, into failure domains that can comprise physically distinct locations, independent network connections and sources of power, and other like attributes such that most potential failures should only affect a single failure domain.

Often, to maintain reliability, redundant copies of data are maintained at multiple ones of such failure domains within a data center, or across multiple, physically distinct, datacenters. Such data sets, however, can be sufficiently large that communication of the data of such data sets across networks can be time-consuming and costly. As a result, redundancy is often achieved at the cost of network resource consumption and, consequently, performance degradation. Additionally, redundancy mechanisms often entail the performance of mathematical operations on the data that can be computationally expensive. Consequently, redundancy can, in addition to increasing network resource consumption, also increase processing capability utilization. Since both network resources and processing capability can be supported by expensive computational hardware, and other like capital investments, efficient utilization thereof, while maintaining redundancy, can be desirable.

SUMMARY

In one embodiment, redundant copies of data can be maintained in an encoded state that utilizes only a fraction of the storage capacity required to store unencoded copies of such data. To reduce the consumption of processing resources, data can be encoded utilizing XOR functionality, which can be performed efficiently by modern processing hardware.

In another embodiment, redundancy can be provided for by redundant copies of data that are maintained in an encoded state that can be generated from only local copies of data, thereby avoiding the consumption of network resources.

In a further embodiment, at least one unencoded copy of data can be maintained, and requests for such data can be provided from such an unencoded copy. Should such an unencoded copy experience a failure, including destructive failures and unavailability failures, a new unencoded copy can be generated by an alternative computing device having access to an encoded copy as well as unencoded copies of other data with which such requested data was encoded.

In a still further embodiment, multiple failures can be survived through recursive application of the decoding of encoded data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
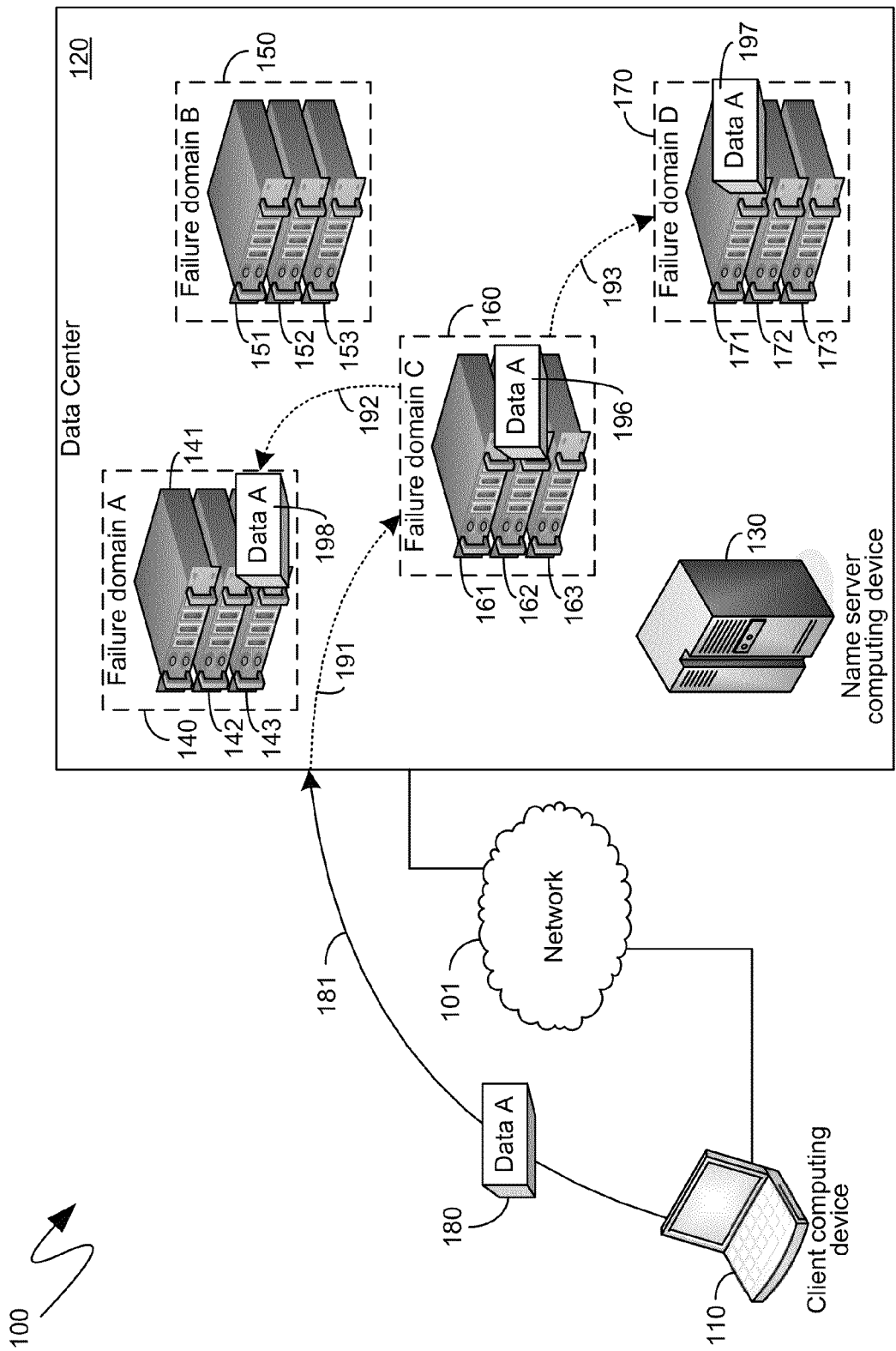
FIG. 1 is a block diagram illustrating an exemplary context within which locally generated simple erasure code mechanisms can be implemented.

The following description relates to mechanisms for implementing locally generated simple erasure codes. An erasure code can be an encoding of multiple different sets of data. Redundant copies of data can be maintained, in such erasure codes, in an encoded state that utilizes only a fraction of the storage capacity required to store unencoded copies of such data. To reduce the consumption of processing resources, and enable more efficient and faster erasure code generation, erasure codes as simple as an "exclusive or", or XOR, can be utilized with the mechanisms described. Additionally, erasure codes can be generated from data that is stored locally on a computing device generating such an erasure code, thereby avoiding the consumption of network resources. At least one unencoded copy of a set of data shall be maintained, while the remaining, redundant copies of such data can be encoded with other, orthogonal data, into one or more erasure codes. Requests for data can be provided from such an unencoded copy. Should an unencoded copy experience a failure, including destructive failures and unavailability failures, a new unencoded copy can be generated by another, operational and available, computing device having access to both an erasure code as well as unencoded copies of the other data that was also pressed into that erasure code. Multiple failures can be survived through recursive application of such a decoding of encoded data.

For purposes of illustration, the techniques described herein are presented within the context of infrastructure typical of data centers. In particular, the techniques described herein make reference to multiple computing devices, multiple failure domains, and network communications between them. However, references to, and illustrations of, such environments and embodiments are strictly exemplary and are not intended to limit the mechanisms described to the specific examples provided. Indeed, the techniques described are equally applicable to any computing environment where redundant copies of data are to be stored, such as on multiple, independent storage media, or on multiple independent computing devices, irrespective of the physical manifestation of such storage media or computing devices.

Additionally, although not required, the description below will be in the general context of computer-executable instructions, such as program modules, being executed by one or more computing devices. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

With reference to FIG. 1, an exemplary system 100 is illustrated, providing context for the descriptions below. Exemplary system 100 can be in the context of a data center, such as the exemplary data center 120, providing data center capabilities and functionality over a network, such as the network 101. A client computing device, such as the client computing device 110, can be utilized by clients of the data center 120 to avail themselves of the data center capabilities and functionality being provided over the network 101. For example, to illustrate operation of the redundancy mechanisms described herein, the exemplary client computing device 110 can transmit, over the network 101, to the data center 120, data 180 that the client computing device 110 seeks to have stored and retained by the data center 120. Such a provision of data is illustrated by the communication 181 shown in FIG. 1.

In one embodiment, upon receipt of the data 180, via the communication 181, the data center 120 can identify one or more computing devices on which to store such data 180. More specifically, name server computing devices, such as the exemplary name server computing device 130, can maintain metadata regarding the data stored on the computing devices of the data center 120, such as exemplary computing devices 141, 142, 143, 151, 152, 153, 161, 162, 163, 171, 172 and 173. Consequently, in such an embodiment, name server computing devices, such as exemplary name server computing device 130, can know which computing device, from among the computing devices of the data center 120, has stored on its local storage media any given collection of data. Name server computing devices can also maintain other metadata, such as information regarding the availability of the server computing devices of the data center 120 to store additional data. The maintenance of metadata, such as the location map of what data is stored on which devices, can be reliably maintained by name server computing devices utilizing transaction and redundancy techniques that can renders such name server computing devices reliably available when needed, insofar as the mechanisms described herein are concerned.

In the example illustrated in FIG. 1, the name server computing device 130 can have identified the computing devices 143, 162 and 171 as the computing devices of the data center 120 that are to maintain three redundant copies, between them, of the data 180, received by the communication 181. The name server computing device 130 can instruct the computing devices 143, 162 and 171, appropriately, and, at least one of such computing devices can accept the data 180 being sent by the client computing device 110. For example, as illustrated in FIG. 1, the communications 181 and 191, the data 180 can initially be directed to the server computing device 162, where it can be stored as data 196. Although the data 180 can be the same as the data 196, different reference numerals are utilized in FIG. 1 to represent that the data 196 is a separate, and independent, copy of the data 180. Likewise, throughout the present application and associated figures, distinct reference numerals will be utilized to refer to distinct copies of the same data.

Upon receiving the data 180 and storing it locally as the data 196, the server computing device 162 can, in one embodiment, retransmit the data 196 to the other computing devices, namely, in the present example, the server computing devices 143 and 171. Communications 192 and 193, shown in the system 100 of FIG. 1, illustrate such a retransmission of the data 196, from the server computing device 162, to the server computing devices 143 and 171, respectively, where such data can be stored as the data 198 and 197, respectively. In other embodiments, the copies of the data 196, 197 and 198 can be generated through alternative communications among the computing devices of the data center 120. Insofar as the mechanisms described herein are concerned, the manner in which copies of data are distributed among the computing devices of the data center 120 can be irrelevant. Similarly, while the mechanisms described herein are exemplarily illustrated utilizing three redundant copies of data, such as the copies of the data 196, 197 and 198, they can be utilized with any data storage redundancy resulting in a total of two or more copies of data being stored among the computing devices of the data center 120. For example, the mechanisms described herein are equally applicable to a data center environment in which only two copies of data are utilized to provide redundancy, such as if each copy can be considered to be stored in a "highly reliable" manner. As another example, the mechanisms described herein are equally applicable to data center environments in which four or copies of data are utilized to provide redundancy, such as if geographic separation is utilized, where each of multiple sites comprise multiple copies.

Nevertheless, for purposes of illustrating operation of the mechanisms contemplated, the data center 120 can, in the state illustrated in the system 100 of FIG. 1, be maintaining three independent copies of the data 180, namely the copies of data 196, 197, and 198. As will be recognized by those skilled in the art, such three copies can provide redundant storage of the data 180 because, if any two or less of those copies were to become unavailable, such as through a hardware failure or a software error, at least one proper and available copy would remain to provide access to such data, such as to the client computing device 110.

In the particular example illustrated in FIG. 1, the three independent copies of data 196, 197, 198, can not only be maintained on separate computing devices, such as the server computing devices 162, 171 and 143, respectively, but they can also be maintained in separate failure domains. More specifically, and as illustrated in FIG. 1, each of the server computing devices 143, 162 and 171 can be part of separate and independent failure domains, namely the failure domains 140, 160 and 170, respectively. Such failure domains can represent physical constructs and environments that can provide for failure independence. For example, the power consumed by the computing devices 141, 142 and 143 of the failure domain 140 can be different and independent from the power consumed by the computing devices 151, 152 and 153 of the failure domain 150. Consequently, if the supply of electrical power is terminated to the failure domain 140, such a power failure will not impact the computing devices of the failure domain 150. As another example, the computing devices of the failure domain 140 can be maintained in a separate building, or other like structure, from the computing devices of the failure domain 150. Consequently, if a structural failure occurs with the building containing the computing devices of the failure domain 150, such a failure would not impact the computing devices of the failure domain 140. Thus, it can be beneficial to maintain redundant copies of data, such as the redundant copies of data 196, 197 and 198, not only on separate computing devices, such as the server computing devices 162, 171 and 143, respectively, but also across separate failure domains, such as the failure domains 140, 160 and 170.

As utilized herein, the term "failure domain", while encompassing the above examples in the context of a data center, is not so limited. Instead, as utilized herein, the term "failure domain" means any hardware component or set of components whose failure is at least partly independent of another hardware component or set of components. Consequently, each individual hard disk drive, or solid state storage device, in an array of such devices, is a "failure domain". Similarly, each individual computing device, such as in a small business or home network is also a "failure domain". As can be seen from these examples, the mechanisms described herein are not limited to data redundancy applications in data centers, but can also be utilized to implement data redundancy among multiple computing device or even multiple storage devices communicationally coupled to a single storage device. In the case of the latter, the single storage device can execute computer-executable instructions that can perform the functions ascribed below to name server computing devices, while the processing capability of the storage devices themselves, such as self-encrypting storage devices, can be sufficient to implement the erasure code generation and decoding mechanisms described below.

Returning back to the exemplary system 100 of FIG. 1, as will also be recognized by those skilled in the art, the maintenance of three separate copies of the data 180, in the form of the copies of data 196, 197 and 198, can consume three times the amount of storage capacity as would be consumed in maintaining a single copy of the data 180. Consequently, it can be desirable to implement mechanisms to continue to maintain data redundancy, such as that illustrated by the system 100 of FIG. 1, without a correspondingly negative impact on storage capacity.

Figure 2:
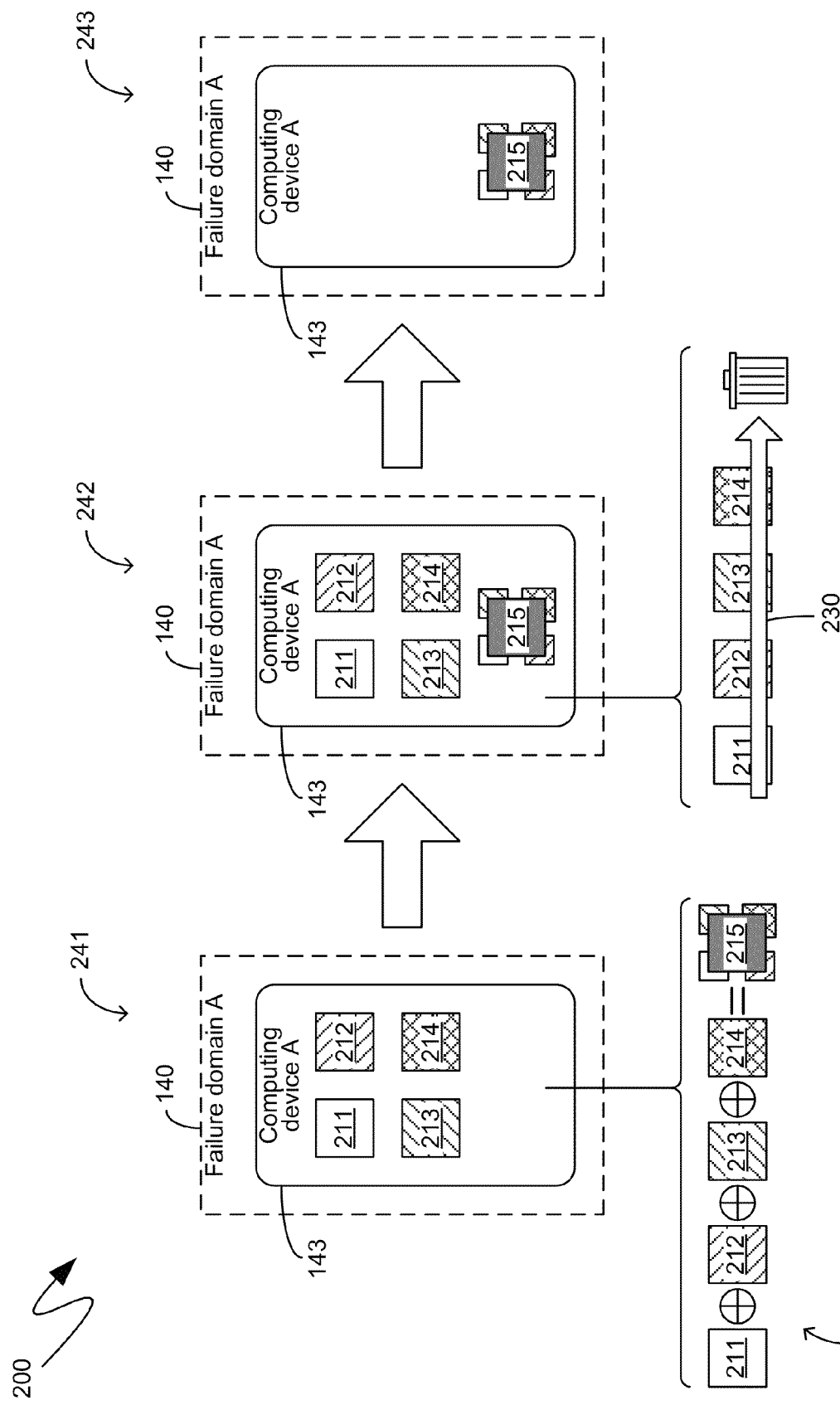
FIG. 2 is a block diagram illustrating an exemplary local generation of a simple erasure code.

Turning to FIG. 2, one such exemplary mechanism is illustrated with reference to the system 200 shown therein. As illustrated by the system 200 of FIG. 2, one or more of the computing devices having a redundant copy of data, such as the aforementioned redundant copies of data 196, 197 and 198 that were shown in FIG. 1, can generate an erasure code representing an encoded version of a copy of data. For example, the computing device 143, in the failure domain 140, of the system 100 of FIG. 1 is illustrated in the system 200 of FIG. 2 as comprising four different collections of data, which, for clarity of reference, will be referred to herein as "extents". As utilized herein, the term "extent" means a chunk or set of data that either comprises a single piece of data, a portion of a larger piece of data, or multiple smaller pieces of data aggregated together. As will be recognized by those skilled in the art, extents are typically utilized to homogenize the size of the discrete pieces of data that are managed, typically within the context of server computing environments hosting such data on behalf of, and for the utilization of, one or more clients. As one example, the extent 211 shown in FIG. 2 can include the redundant copy of the data 180, namely the copy of data 198, that was illustrated in FIG. 1, and described above, as being stored on the computing device 143 in the failure domain 140. The extent 211 can include further data, in addition to the data 198, or, alternatively, the extent 211 can include only a portion of the data 198. However, because the copy of data 198 can be easily obtained from the extent 211, provision of the extent 211 will be equated, for ease of reference in the descriptions below, to provision of the copy of data 198.

As illustrated by the exemplary system 200 of FIG. 2, the computing device 143 can comprise additional extents, such as the extents 212, 213 and 214, which can comprise additional data, including data unrelated to, or orthogonal to, the data of the extent 211. In one embodiment, the computing device 143, upon obtaining a suitable collection of extents, such as the exemplary collection of the four extents 211, 212, 213 and 214, can generate an erasure code from such extents. As indicated previously, the mechanisms described herein enable the utilization of simple erasure codes to provide reduced storage resource consumption while maintaining data redundancy. A very simple erasure code, which the mechanisms described provide for, can be the "exclusive or", or XOR, operation. For example, as illustrated by the computation 220, the computing device 143 can, in one embodiment, merely XOR the extents 211, 212, 213 and 214 in order to generate an erasure code 215. Such an XORing can be bitwise, bytewise, or can utilize any other appropriately sized delineation of binary data.

The utilization of the XOR function can enable the computation 220 to be performed very quickly since, as will be recognized by those skilled in the art, an XOR operation can be natively performed by most transistor-based processing hardware. Additionally, as will also be recognized by those skilled in the art, the relationship between the extents 211, 212, 213 and 214, and the erasure code 215, which was generated by XORing those extents together, can be such that any one of the extents 211, 212, 213 and 214, and the erasure code 215 can be generated from any collection of the other four. Such a relationship can be based on the fact that, if A XOR B is equal to C, then A XOR C is equal to B and B XOR C is equal to A. The possession of any two of A, B and C enables the third to be generated through the use of the XOR operation. Of course, all erasure codes share analogous capabilities to recover a missing set of data from the any combination of the erasure code and the other, non-missing data sets. Consequently, while the descriptions below are exemplarily illustrated utilizing XOR functionality, the mechanisms described herein are equally compatible with any erasure code schemes. Utilization of XOR functionality is merely meant to illustrate that the mechanisms described are not limited to computationally expensive erasure code schemes in order to provide reduced storage capacity consumption while maintaining data redundancy.

Consequently, in the state 241, the computing device 143 can have stored on its storage media extents, such as the extents 211, 212, 213 and 214, and can comprise additional storage capacity so as to be able to generate the erasure code 215 and store it locally on the computing device 143. Subsequently, upon completion of the computation 220, the computing device 143 can be in the state 242 where it has stored on its storage media extents 211, 212, 213 and 214 as well as the erasure code 215. When the computing device 143 has completed its generation of the erasure code 215, such as is illustrated by the state 242 in FIG. 2, in one embodiment, the computing device 143 can discard each of the extents utilized to generate the erasure code 215. Thus, as illustrated by the discarding action 230, the computing device 143 can, in such an embodiment, discard its copies of the extents 211, 212, 213 and 214. As a result, the computing device 143 can end up in the state 243 where it only has stored on its storage media the erasure code 215.

By discarding the extents 211, 212, 213 and 214 that were stored on the storage media of the computing device 143, and retaining only the erasure code 215, the computing device 143 can reduce the amount of storage capacity it is consuming. More specifically, and as will be recognized by those skilled in the art, due to the nature of the XOR operation, the erasure code 215 can be approximately the same size as a largest one of the extents 211, 212, 213 and 214. If the extents 211, 212, 213 and 214 are selected by the computing device 143 to be approximately equal in size, then the erasure code 215 can consume as little as one quarter of the storage capacity consumed by the extents 211, 212, 213 and 214.

Returning briefly to FIG. 1, the system 100 shown therein illustrates the retention, by the data center 120, of three copies of the data 180, namely the copies of data 196, 197 and 198. The erasure code generation mechanisms described above can have been undertaken by the server computing device 143, resulting in the copy of the data 198 only being available in such an encoded form, on the server computing device 143. In one embodiment, the server computing device 171 can undertake an analogous operation with respect to its copy of the data 197. Consequently, in such an embodiment, data redundancy can be provided while consuming as little as one half of the storage capacity that would have been consumed by the three copies of data 196, 197 and 198. More specifically, and as demonstrated above, the presently described erasure code can consume as little as one quarter of the storage capacity of unencoded data. Thus, if both the copies 197 and 198 have been encoded into erasure codes, such as in the manner illustrated, then the storage capacity consumed can be the full amount for the unencoded data, plus one quarter of the full amount for each of the two copies of the data that were encoded into erasure codes, thereby resulting in a total storage capacity consumption of one and one half times the full amount of the data 180. Since the redundant storage of the three copies of data 196, 197 and 198 consumes three times the full amount of the data 180, such a consumption of only one and one half times the full amount of the data 180 can represent a consumption of as little as one half of the storage capacity that would have been consumed by three copies unencoded copies of data.

Figure 3:
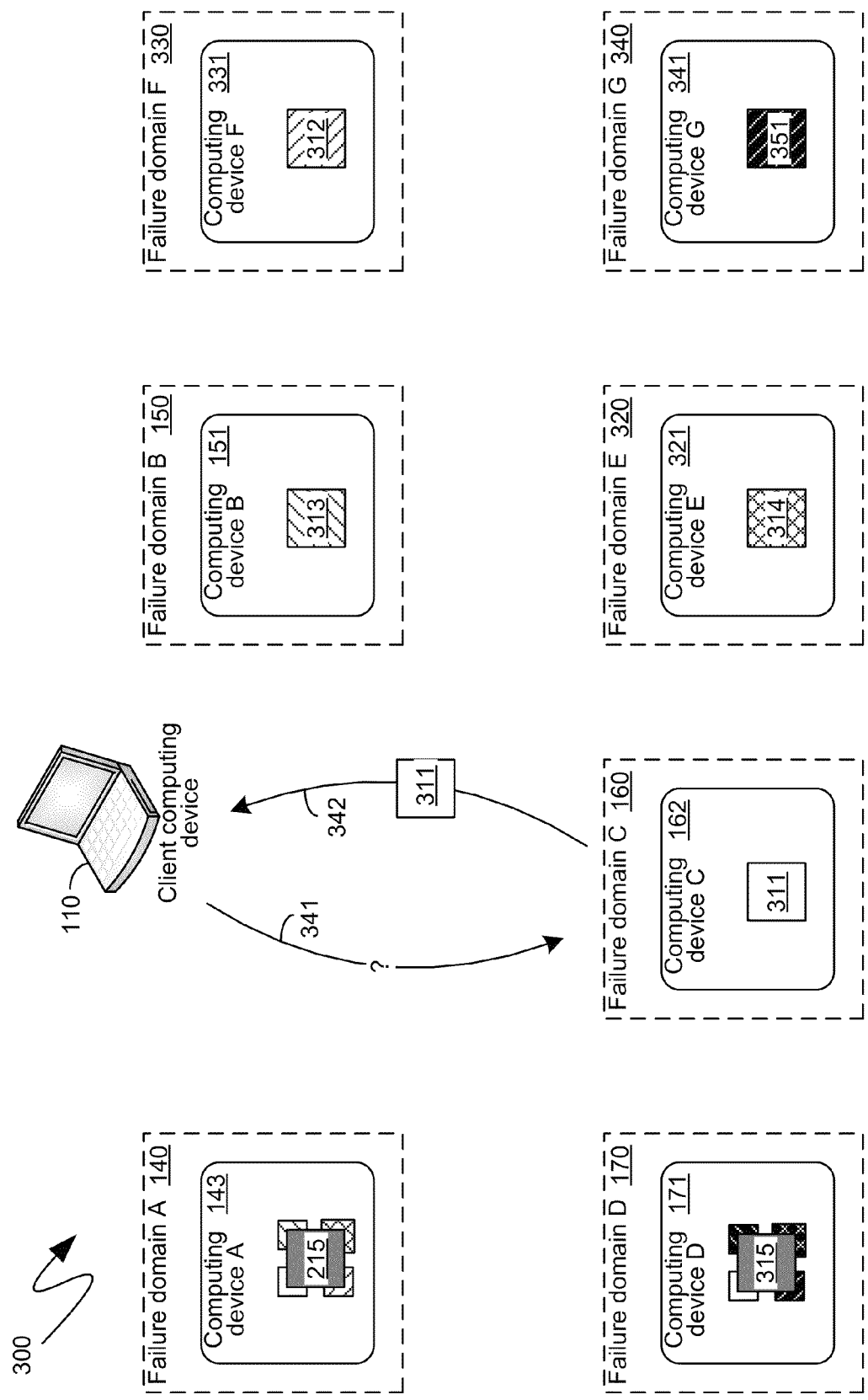
FIG. 3 is a block diagram illustrating an aspect of the operation of an exemplary system implementing locally generated simple erasure code mechanisms.

Turning to FIG. 3, some of the computing devices and failure domains illustrated in the system 100 of FIG. 1 are shown in simplified form in the system 300 of FIG. 3. For example, the system 300 is shown as comprising the failure domain 140, with the computing device 143, the failure domain 150, with the computing device 151, the failure domain 160, with the computing device 162 and the failure domain 170, with the computing device 171, each of which were originally presented above in connection with the system 100 shown in FIG. 1. In the exemplary system 300 of FIG. 3, the computing device 143 is illustrated as comprising the erasure code 215 whose generation was illustrated in FIG. 2, and described in detail above. In an analogous manner, the computing device 171 can also have generated an erasure code 315 from an extent comprising its copy of the data 197, shown in FIG. 1, as encoded with other extents that have not yet been illustrated. For example, one of the extents that could have been stored on the computing device 171, which the computing device 171 can have selected for erasure code generation, can have been its copy of the extent 351, shown in the system 300 of FIG. 3 as being stored on the storage devices of the computing device 341 in the failure domain 340.

As illustrated by the exemplary system 200 of FIG. 2, the erasure code 215, generated by the computing device 143, can have been generated from the extents 211, 212, 213 and 214 that were shown in FIG. 2. One such extent, namely the extent of 211, can have been the copy of the extent 311 that was stored on the server computing device 143. The unencoded extent 311 is illustrated in the exemplary system 300 of FIG. 3 as being stored on the storage devices of the computing device 162 of the failure domain 160. For ease of reference, copies of extents will be referred to herein as "instances" of extents. Thus, the extent 311 is an instance of the extent 211 shown in FIG. 2. Similarly, an unencoded instance of the extent 212, in the form of the extent 312, is illustrated as being stored on the computing device 331 of the failure domain 330. Unencoded instances of the extents 213 and 214, also shown in FIG. 2, and also utilized in the generation of the erasure code 215, by the computing device 143, are illustrated in the exemplary system 300 of FIG. 3 as being stored on the computing device 151, of the failure domain 150, as the unencoded extent 313, and on the computing device 321, the failure domain 320, as the unencoded extent 314.

In one embodiment, when a particular set of data is requested, such as, for example, if the client computing device 110 transmits a request 341 for data it previously provided, name server computing devices, which are not specifically illustrated in the system 300 of FIG. 3, can identify the computing device 162 as comprising an extent 311 that is both unencoded and which comprises the data requested by the client computing device 110, via the request 341. Indeed, name server computing devices can track a location and status, such as whether each instance of each extent is in an encoded or unencoded form, of each of the extents shown in the system 300 of FIG. 3. Consequently, such name server computing devices can route the request 341 to the computing device 162, which can then respond with the unencoded extent 311, or the relevant portion thereof, as illustrated by the communication 342 of the system 300 of FIG. 3. In one embodiment, name server computing device functionality can be provided by any one or more of the computing devices shown in FIG. 3. For example, the client computing device 110 can execute computer-executable instructions providing for name server functionality. In such an embodiment, the client computing device 110 could, itself, acting as a name server, determine that the request 341 is to be directed to the computing device 162. In other embodiments, as indicated, the client computing device 110 can be explicitly instructed to direct the request 341 to the server computing device 162 by other name server computing devices. The responsive provision of the extent 311, to the client computing device 110, via the communication 342, assumes that the computing device 162 is operational, communicationally available to the client computing device 110, and that the extent 311 is properly and correctly stored on the computing device 162.

Figure 4:
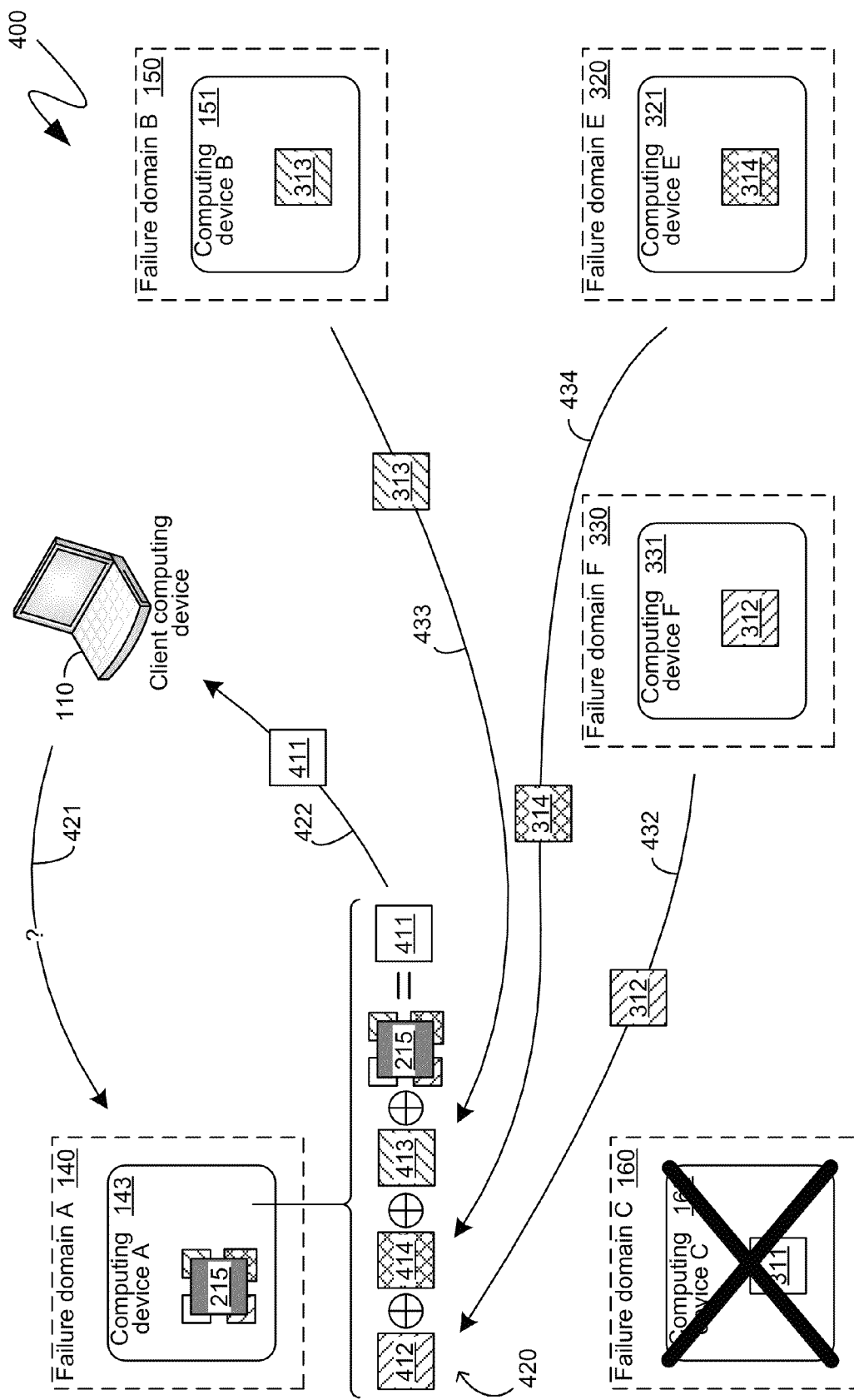
FIG. 4 is a block diagram illustrating an exemplary error recovery in a system implementing locally generated simple erasure code mechanisms.

Turning to FIG. 4, the system 400 shown therein illustrates an operation accounting for a failure of the computing device 162. Such a failure can include a hardware failure of the computing device 162 itself, or any of its components, a failure of the relevant support mechanisms, such as power delivery, an unavailability of the computing device 162, such as due to a temporary condition such as a restart or a crash, or a failure in the form of improper or incorrect storage of the extent 311 on one or more storage devices of the computing device 162. Irrespective of the reason why the computing device 162 cannot provide the extent 311, the client computing device 110 can still have a request 421 for data that is contained in the extent 311. As indicated previously, in the exemplary scenario described above, the computing device 143 can have comprised an instance of the extent 311, namely the extent 211 that was shown in FIG. 2, and such an instance can be encoded in the erasure code 215. Consequently, in one embodiment, the request from the client computing device 110 can be directed, such as by the above described name server computing devices, to the computing device 143. Such a request, from the client computing device 110 to the server computing device 143, is illustrated in the system 400 of FIG. 4 as the request 421.

In response to the request 421, the computing device 143 can be provided with an unencoded version of the extent 211 that was previously stored on such a computing device. In one embodiment, the computing device 143 can obtain such an unencoded version of the extent 211 by XORing the erasure code 215 with the other extents, excluding the extent 211, that were originally XORed in order to generate the erasure code 215 in the first place. In other embodiments, an unencoded version of the extent 211 can be obtained from the erasure code 215 and the other extents 212, 213 and 214 that were encoded into such the erasure code 215 utilizing whatever mechanisms are appropriate given the erasure code generation mechanisms utilized to generate the erasure code 215 in the first place. To perform such a decoding of the extent 211 from the erasure code 215, the computing device 143 can request, from other computing devices, instances of the extents 212, 213 and 214, from which the erasure code 215 was generated, such as was shown in FIG. 2. For example, the computing device 143 can communicate with name server computing devices which can, in turn, identify one or more computing devices that can have stored thereon, in unencoded form, instances of the extents 212, 213 and 214 that were shown in FIG. 2, and from which the erasure code 215 was generated. In the exemplary system 400 illustrated in FIG. 4, a computing device 331 can comprise an unencoded extent 312 that can be an instance of the extent 212 that was shown in FIG. 2, and which was utilized to generate the erasure code 215. Similarly, in the exemplary system 400 illustrated in FIG. 4, computing devices 151 and 311 can comprise unencoded extents 313 and 314, respectively, which can be instances of the extents 213 and 214, respectively, which were shown in FIG. 2, and which were also utilized to generate the erasure code 215.

To enable the computing device 143 to regenerate the unencoded extent 211, shown in FIG. 2, the computing device 331 can provide an instance of the unencoded extent 312 to the computing device 143, as illustrated by the communication 432 in FIG. 4. As received and stored on the computing device 143, the instance of the extent 312 bears reference number 412 in FIG. 4 to illustrate that it is a different copy, stored on the computing device 143, as opposed to the computing device 331. Additionally, for purposes of the present example, the extents 412 and 312 shown in FIG. 4, and the extent 212 shown in FIG. 2, can all be instances of the same extent. Similarly, to enable the computing device 143 to regenerate the unencoded extent 211, the computing device 311 can provide an instance of the unencoded extent 314, as illustrated by the communication 434, and the computing device 151 can provide an instance of the unencoded extent 313, as illustrated by the communication 433. As stored on the computing device 143, the instance of the extent 314 bears reference 414 in FIG. 4, and the instance of the extent 313 bears reference 413 to signify that they are separate copies.

Once the computing device 143 has obtained the extents 412, 414 and 413, which, as indicated, can be instances of the extents 212, 214 and 213, respectively, shown in FIG. 2, and utilized to generate the erasure code 215, the computing device 143 can, in one embodiment, XOR the extents 412, 414, 413 and the erasure code 215 together, as illustrated by the computation 420, to derive an extent 411 that can be a copy of the extent 211 originally utilized to generate the erasure code 215. In other embodiment, as described, the computation 420 can derive the extent 411 utilizing whatever mechanisms are applicable given the erasure coding utilized to generate the erasure code 215 in the first place. The server computing device 143 can then provide the unencoded extent 411, or the relevant portions thereof, to the client computing device 110 in the communication 422, in response to the communication 421.

As can be seen, the server computing device 143 can provide a redundant copy of the extent of 311, which is no longer accessible due to the failure of the server computing device 163, in the form of the unencoded extent 411. The server computing device 143 can provide such a redundant copy while only having retained the single erasure code 215 which, as indicated, can consume as little as one quarter of the storage capacity consumed by the four extents that were pressed together to generate such a single erasure code 215. Additionally, as illustrated in FIG. 2, and as described in detail above, the erasure code 215 can have been generated by data that was locally stored on the computing device 143, thereby avoiding network transmissions for purposes of generating the erasure code 215 in the first place. While network transmissions, such as the communications 432, 433 and 434, illustrated in FIG. 4, and described in detail above, can be necessary to generate an unencoded extent from an erasure code into which such an extent was pressed, such network transmissions can be of analogous magnitude to network transmissions typically required by redundancy mechanisms in the event of a failure. Consequently, the above-described mechanisms can result in a meaningful reduction in the amount of network transmissions, while still providing an equivalent amount of redundancy.

Additionally, as can also be seen, the mechanisms described can provide for the utilization of very simple erasure code schemes, including, but not limited to, utilization of the simple mathematical XOR operation. Such the resulting erasure codes can be utilized to provide requested data in the event of a failure, while simultaneously consuming a fraction of the storage capacity consumed by unencoded data. Consequently, the above-described mechanisms can provide redundancy while optimally utilizing both storage and processing capacity.

Figure 5:
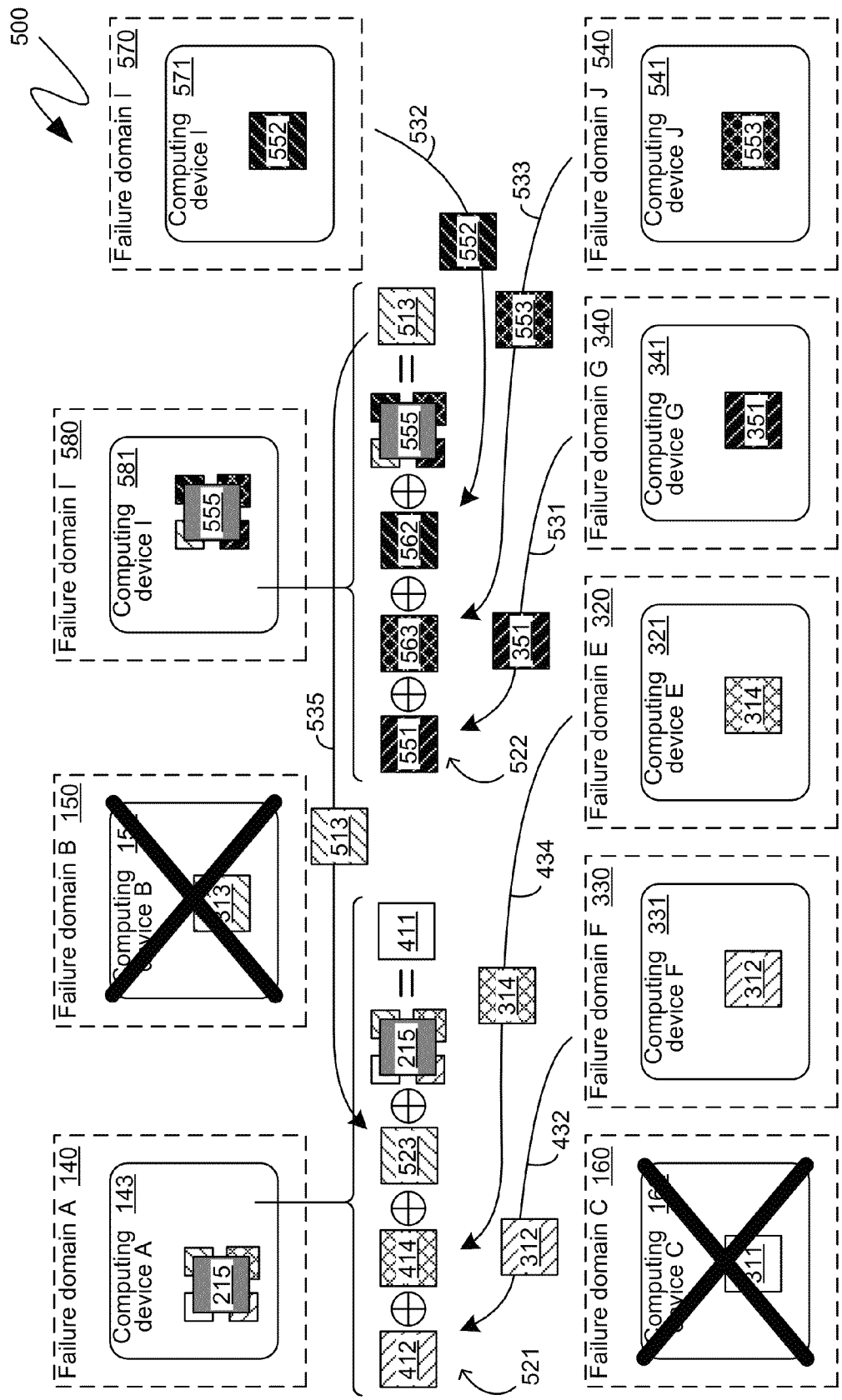
FIG. 5 is a block diagram illustrating another exemplary error recovery in a system implementing locally generated simple erasure code mechanisms.

In one embodiment, the mechanisms described herein can be implemented in a recursive fashion to survive multiple failures. For example, and with reference to exemplary system 500 of FIG. 5, in one embodiment, the computing device 143 can still generate the extent 411, such as in a manner analogous to that described in detail above with respect to the exemplary system 400 of FIG. 4, even if the server computing device 162 has failed, and if one of the computing devices comprising an unencoded extent that is requested by the computing device 143, such as, for example, the server computing device 151, have also failed. More specifically, and as is illustrated by the exemplary system 500 of FIG. 5, the computing device 143 can still request the unencoded extents that it utilized to generate the erasure code 215, other than, of course, the extent 211 that is being unencoded. However, in the exemplary system 500 of FIG. 5, while the server computing device 143 can receive the extents 312 and 314, from the computing devices 331 and 321, respectively, via the communications 432 and 434, respectively, and store them as the extents 412 and 414, respectively, the server computing device 143 may fail in obtaining any extent from the computing device 151, because such a computing device can also have failed.

In such a situation, in one embodiment, the above-described mechanisms can be applied recursively. More specifically, the server computing device 143 can act as a client and can request an unencoded instance of the extent 213, which it utilized to generate the erasure code 215. In response, and as described in detail above, name servers can identify one or more computing devices comprising erasure codes that were generated from an instance of the extent 213. For example, the name servers can identify the computing device 581, from the failure domain 580, as comprising an erasure code 555 that can have been generated from extents that included an instance of the extent 213. Such an identified computing device 581 can then perform the above-described steps to decode an instance of the extent 213. For example, the server computing device 581 can obtain, from other computing devices, unencoded versions of the other extents that were utilized to generate the erasure code 555. Consequently, as illustrated by the exemplary system 500 of FIG. 5, the computing device 341 can provide the extent 351, via the communication 531. As stored on the computing device 581, the instance of the provided extent 351 bears the reference number 551 in FIG. 5 to illustrate that it is a different copy of the extent 351. Similarly, the computing device 541, from the failure domain 540, can provide the unencoded extent 553, via the communication 533. Likewise, the computing device 571, from the failure domain 570, can provide the unencoded extent 552 via the communication 532. As stored on the computing device 581, the instance of the extent 553 bears the reference number 563 in FIG. 5 to illustrate that it is a different copy of the extent 553. Similarly, the instance of the extent 552 bears the reference number 562.

With the extents 551, 563, 562, and with the erasure code 555 that it originally possessed, the computing device 581 can perform the computation 522 to generate the unencoded extent 513. For example, in the specific embodiment illustrated, the unencoded extent 513 can be generated by XORing the extents 551, 563 and 562, and the erasure code 555, as illustrated by the computation 522. In other embodiments, as described, decoding mechanisms, appropriate for the erasure code mechanisms utilized to generate the erasure code 555 in the first place, can be utilized. In such a manner the computing device 581 can derive the extent 513. The extent 513 can be an instance of the extent 313 that is no longer accessible due to the failure of the computing device 151. Consequently, once the extent 513 is derived, such as by the computing device 581, it can be provided to the computing device 143, as illustrated by the communication 535. Upon receipt of the extent 513, which the computing device 143 can store as the extent 523, the computing device 143 can proceed with the computation 521, such as in the manner described in detail above, with the exception that the extent 313, which was described above as being obtained from the computing device 151, is replaced with the equivalent extent 523, which was generated in the manner described in response to the failure of the computing device 151. Performance of the computation 521 can result in the extent 411, as indicated previously. Consequently, as can be seen, through iterative application of the above described mechanisms, multiple failures can be tolerated.

For purposes of illustration, the above-described mechanisms have been described in the context of a redundancy in which three copies of data are stored. The above-described mechanisms enable two of those copies to be reduced to an erasure code, thereby reducing the utilization of storage capacity, while maintaining redundancy. Such descriptions, however, are strictly exemplary, and the described mechanisms are equally applicable to any other amount of redundancy. For example, two copies of data can be stored, one of which can be utilized to generate an erasure code set. As another example, four copies of data can be stored, two of which can be utilized to generate erasure code sets, and two more can retained in unencoded form. Other permutations are equally possible, as will be recognized by those skilled in the art.

In other permutations, different quantities of failure domains can be utilized and different amounts of storage capacity savings can be realized. For example, if four redundant copies of data were maintained by a data center, and three such copies where pressed into erasure codes, such as in the manner described in detail above, then seven failure domains can provide for a greater level of reliability than could be achieved with three full, unencoded redundant copies. Such a system could, however, utilize only one third the overall storage capacity as would be utilized by the initial four redundant copies of data. In particular, one unencoded copy of data could be maintained, while erasure codes could consume one sixth, one ninth and one eighteenth, respectively, of the amount of storage space that would be consumed by an unencoded copy, as will be recognized by those skilled in the art.

Figure 6:
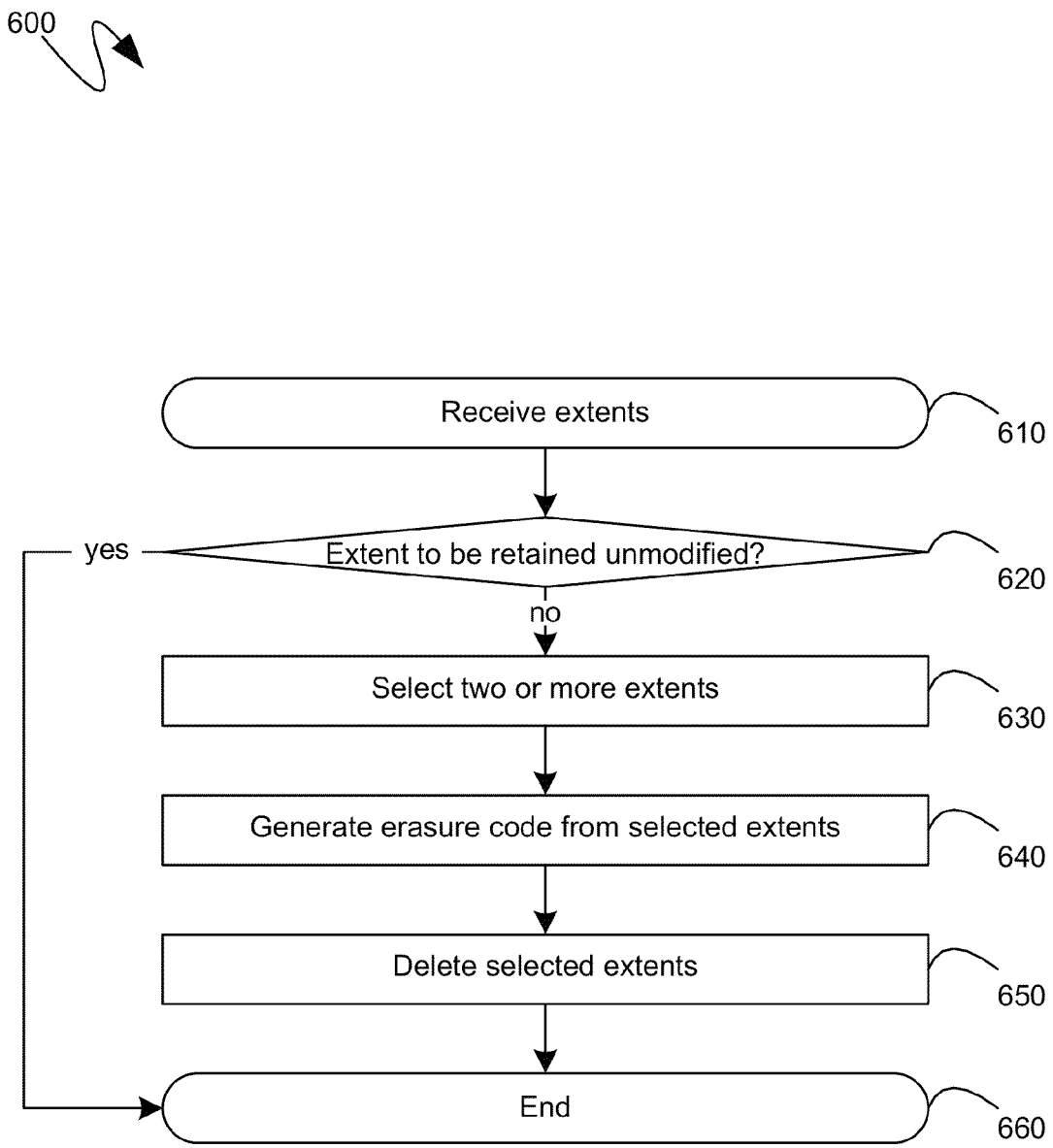
FIG. 6 is a flow diagram illustrating an exemplary local generation of a simple erasure code.

Turning to FIG. 6, the flow diagram 600 shows therein an exemplary series of steps by which an erasure code can be generated, such as by a server computing device comprising two or more extents that it seeks to press into an erasure code. As utilized herein the verb "press" means to create an erasure code from two or more extents. Initially, at step 610, as illustrated, two or more extents can be received for storage on a local storage medium of a computing device performing the steps of the flow diagram 600. Subsequently, at step 620, a decision can be made as to whether extents are to be retained in an unmodified, and unencoded, form. As illustrated above, certain ones of the computing devices receiving redundant copies of extents can retain such extents in unencoded form and can refrain from pressing such extents into erasure codes. In one embodiment, a determination of which computing devices are to maintain extents in unencoded forms can be performed by name servers. In an alternative embodiment, an initial determination can be made by individual ones of the computing devices, which can then, subsequently, seek approval from a centralized authority, such as a name server. Irrespective of the manner in which the determination, at step 620, is made, if it is determined, at step 620, that an extent is to be retained in an unmodified form, than the relevant processing can end at step 660.

Conversely, if, at step 620, it is determined that extents are to be pressed into erasure codes, processing can proceed with step 630 where two or more extents can be selected to be pressed into an erasure code. As indicated previously, in one embodiment, four extents can be pressed into a single erasure code. As will be recognized by those skilled in the art, however, any number of extents greater than one can be pressed into erasure codes utilizing the above described mechanisms, and the descriptions above, provided within the context of the pressing of four extents into a single erasure code, were strictly exemplary and provided for clarity of illustration, and in no way should be read to limit the above described embodiments to erasure codes generated from only four extents.

In one embodiment, the selection of extents, at step 630, entails selecting two or more extents having approximately equivalent size, since, as indicated, the size of a resulting erasure code can be equivalent to the size of the largest extent pressed into such an erasure code. Consequently, if approximately equal sized erasure codes are selected, the storage capacity savings can be maximized. Additionally, in one embodiment, the selection of extents, at step 630, can entail selecting two or more extents whose content can be compatible. Compatibility can entail content having approximately similar lifetimes, similar possibilities for being requested or accessed, similar source, or other like similarities.

The selection of extents, such as at step 630, can be informed by name server computing devices, or can otherwise account for the computing devices that are assigned to store the copies of the selected extents in an unencoded form. More specifically, the selection of two or more extents, at step 630, can avoid selecting two or more extents to be pressed into a single erasure code where both such selected extents are stored, in an unencoded form, within the same failure domain. As will be recognized by those skilled in the art, in such an instance, should a failure occur impacting such a failure domain, two extents would, simultaneously, become unavailable, rendering reconstruction of such extents from an erasure code substantially more difficult.

Once two or more extents have been selected, at step 630, processing can proceed to step 640, where an erasure code can be generated from the selected extents. As described in detail above, one simple erasure code scheme that is supported by the mechanisms described is the XOR operation. Thus, at step 630, in such an exemplary embodiment, the erasure code can be generated from the selected extents by XORing those extents. As also indicated previously, the XOR operation can be performed bitwise, bytewise, or on any other appropriate delineation of binary data. Subsequently, once the erasure code has been generated, at step 640, the extents selected at step 630, which have now been pressed into the erasure code, at step 640, can be deleted at step 650. The relevant processing can then end at step 660.

Figure 7:
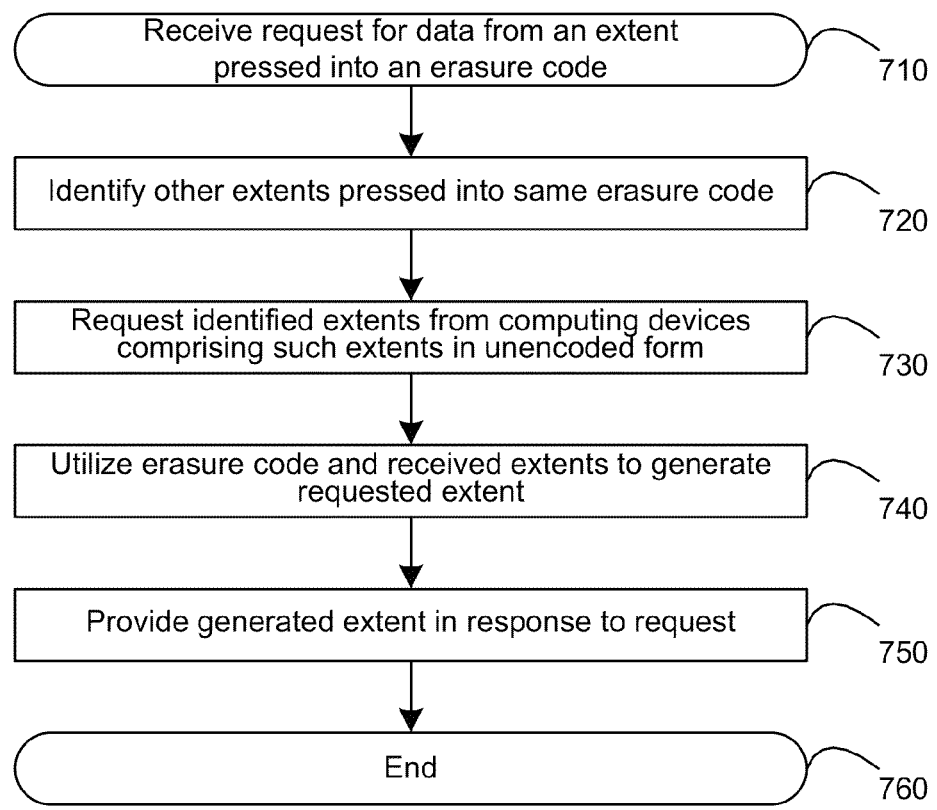
FIG. 7 is a flow diagram illustrating an exemplary utilization of a simple erasure code to provide redundant data.

Turning to FIG. 7, the flow diagram 700 shown therein illustrates an exemplary series of steps by which an extent can be unencoded from an erasure code into which such an extent was pressed. Initially, at step 710, a request can be received for an extent, or from data from an extent, which has already been pressed into an erasure code. In one embodiment, not specifically illustrated in FIG. 7, the deletion of extent subsequent to the generation of a corresponding erasure code, can be delayed for any number of reasons. Consequently, in such an embodiment, a check can be made, after receiving the request, at step 710, to determine whether the requested extent has not yet been deleted. If the requested extent has not yet been deleted, then such an extent can simply be returned, in response the request received at step 710, and the relevant processing can end at step 760.

If, however, the requested extent has already been deleted, and only an erasure code, into which such an extent has been pressed, remains, processing can proceed to step 720, where identification of the other extents that were pressed into that same erasure code can be performed. In one embodiment, step 720 can be performed by each individual computing device, which can retain, with the erasure code, metadata, including an indication of which extents were pressed into such an erasure code. In an alternative embodiment, step 720 can be performed by external computing devices, such as name server computing devices, which can be queried for the identity determined at step 720. Subsequently, at step 730, the identified extent can be requested from computing devices that have stored on their storage media such extents in an unencoded form. An identification of the computing devices to which to direct the request, at step 730, can be received from the name server computing devices, or, alternatively, can be known locally to the computing device executing the flow diagram 700.

If one or more of the computing devices to which the requests, at step 730, were directed do not comprise the extents in an unencoded form, then those computing devices can, in turn, perform the steps of the exemplary flow diagram 700 of FIG. 7. Upon receiving the extents that were requested at step 730, processing can proceed to step 740, where the received extents and the erasure code that is present locally can be utilized to generate the requested, missing extent. In one exemplary embodiment, for processing efficiency, simple erasure code schemes, such as the simple XOR erasure code, can be utilized. In such an exemplary embodiment, as described in detail above, the missing extent can be generated at step 740 by simply XORing the locally available erasure code with the extents that were requested at step 730 and received prior to the operation of step 740. As before, the XORing, at step 740, can be performed bitwise, bytewise, or on any other appropriate delineation of binary data. The extent generated at step 740 can then be provided, at step 750, in response to the request that was received at step 710. The relevant processing can then end at step 760.

In one embodiment, although not illustrated in the Figures, the decoding of an extent, from an erasure code, can be performed by the entity requesting data from the extent. Such an embodiment can provide network transmission optimizations due to the avoidance of the transmission of the resulting unencoded extent.

Figure 8:
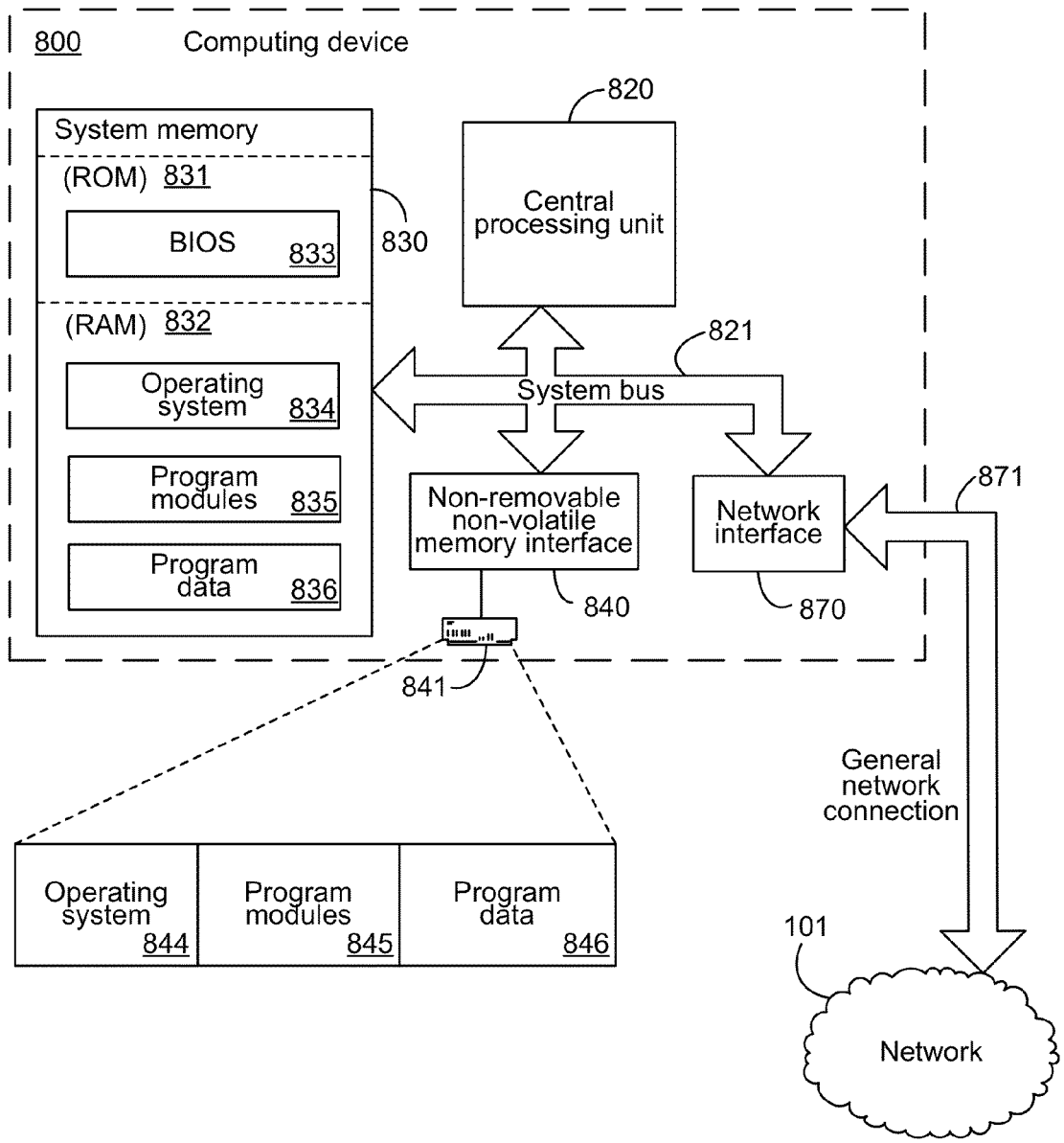
FIG. 8 is a block diagram of an exemplary computing device.

Turning to FIG. 8, an exemplary computing device 800 is illustrated, comprising, in part, hardware elements that can be utilized in performing and implementing the above described mechanisms. The exemplary computing device 800 can include, but is not limited to, one or more central processing units (CPUs) 820, a system memory 830 and a system bus 821 that couples various system components including the system memory to the processing unit 820. The system bus 821 may be any of several types of bus structures including a memory bus or memory controller, a peripheral bus, and a local bus using any of a variety of bus architectures. Depending on the specific physical implementation, one or more of the CPUs 820, the system memory 830 and other components of the computing device 800 can be physically co-located, such as on a single chip. In such a case, some or all of the system bus 821 can be nothing more than silicon pathways within a single chip structure and its illustration in FIG. 8 can be nothing more than notational convenience for the purpose of illustration.

The computing device 800 also typically includes computer readable media, which can include any available media that can be accessed by computing device 800. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 800. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the computing device 800 may operate in a networked environment via logical connections to one or more remote computers. The logical connection depicted in FIG. 8 is a general network connection 871 to the network 101 described previously. The network 101 to which the exemplary computing device 800 is communicationally coupled can be a local area network (LAN), a wide area network (WAN) such as the Internet, or other networks. The computing device 800 is connected to the general network connection 871 through a network interface or adapter 870, which is, in turn, connected to the system bus 821. In a networked environment, program modules depicted relative to the computing device 800, or portions or peripherals thereof, may be stored in the memory of one or more other computing devices that are communicatively coupled to the computing device 800 through the general network connection 871. It will be appreciated that the network connections shown are exemplary and other means of establishing a communications link between computing devices may be used.

Among computer storage media, the system memory 830 comprises computer storage media in the form of volatile and/or nonvolatile memory, including Read Only Memory (ROM) 831 and Random Access Memory (RAM) 832. A Basic Input/Output System 833 (BIOS), containing, among other things, code for booting the computing device 800, is typically stored in ROM 831. RAM 832 typically contains data and/or program modules that are immediately accessible to and/or presently being operated on by processing unit 820. By way of example, and not limitation, FIG. 8 illustrates operating system 834, other program modules 835, and program data 836.

The computing device 800 may also include other removable/non-removable, volatile/nonvolatile computer storage media. By way of example only, FIG. 8 illustrates a hard disk drive 841 that reads from or writes to non-removable, non-volatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840.

The drives and their associated computer storage media discussed above and illustrated in FIG. 8, provide storage of computer readable instructions, data structures, program modules and other data for the computing device 800. In FIG. 8, for example, hard disk drive 841 is illustrated as storing operating system 844, other program modules 845, and program data 846. These components can either be the same as or different from operating system 834, other program modules 835 and program data 836. Operating system 844, other program modules 845 and program data 846 are given different numbers here to illustrate that, at a minimum, they are different copies.

As can be seen from the above descriptions, mechanisms providing for data redundancy through the use of locally generated XOR-based erasure codes have been presented. In view of the many possible variations of the subject matter described herein, we claim as our invention all such embodiments as may come within the scope of the following claims and equivalents thereto.

We claim:

1. A computing device comprising:
   one or more processing units; and
   one or more computer-readable media comprising computer-executable instructions, which, when executed by the one or more processing units, cause the computing device to:
   select two or more extents, each of the selected two or more extents having a locally stored instance;
   determine, for each of the selected extents, that another instance of that same extent is stored in an unencoded form on a distinct failure domain;
   generate an erasure code from the locally stored instances of the selected two or more extents;
   delete the locally stored instances of the selected two or more extents after the erasure code is generated; and
   retaining the erasure code in place of the deleted locally stored instances of the selected two or more extents;
   wherein any one of the selected two or more extents can be locally regenerated from the generated erasure code and the others of the selected two or more extents as obtained from distinct failure domains.

2. The computing device of claim 1, wherein the computer executable instructions causing the computing device to generate the erasure code from the locally stored instances of the selected two or more extents comprise computer-executable instructions, which, when executed by the one or more processing units, cause the computing device to XOR the locally stored instances of the selected two or more extents.

3. The computing device of claim 1, wherein the computer executable instructions causing the computing device to select the locally stored instances of the two or more extents comprise computer-executable instructions, which, when executed by the one or more processing units, cause the computing device to select the two or more extents such that the locally stored instances of the selected extents are of equivalent size.

4. The computing device of claim 1, wherein the computer executable instructions causing the computing device to select the locally stored instances of the two or more extents comprise computer-executable instructions, which, when executed by the one or more processing units, cause the computing device to select the two or more extents such that a content of one of the selected extents is determined to have a probability of being requested equivalent to that of a content of each of the others of the selected extents.

5. The computing device of claim 1, wherein the two distinct failure domains comprise two distinct storage media of a redundant storage system.

6. The computing device of claim 1, wherein the computer readable media comprise further computer-executable instructions for generating an instance of a requested extent from the erasure code, after having deleted the requested extent, the requested extent being one of the selected extents, the further computer-executable instructions, when executed by the one or more processing units, causing the computing device to:
- identify, after the deleting after the erasure code generation, all of the selected extents other than the requested extent, whose locally stored instances were also pressed into the erasure code;
- request the identified other extents from locations where instances of the identified other extents are stored in an unencoded form;
- receive, in response to the requesting, instances of the identified other extents in the unencoded form; and
- generate the requested extent from the erasure code and the received instances of the other extents in the unencoded form.

7. The computer-readable media of claim 6, wherein the computer-readable media comprise further computer-executable instructions, which, when executed by the one or more processing units, cause the computing device to: request, from one or more name servers, the locations where instances of the identified other extents are stored in the unencoded form.

8. The computer-readable media of claim 6, wherein the computer-readable media comprise further computer-executable instructions, which, when executed by the one or more processing units, cause the computing device to:
- receive a request for the extent;
- determine whether the deleting after the erasure code generation has already been performed; and
- only perform the identifying, the requesting, the receiving, and the generating the extent if the deleting after the erasure code generation has already been performed.

9. A method of redundantly storing computer-readable data onto computer-readable storage media, the method comprising the steps of:
- receiving data for storage;
- generating a first extent, the first extent comprising at least part of the data;
- storing each of two or more instances of the generated first extent on two or more distinct failure domains;
- selecting, at a first one of the two or more distinct failure domains, an instance of the first extent that is locally stored at the first one of the two or more distinct failure domains and an instance of at least one other extent that is also locally stored at the first one of the two or more distinct failure domains;
- determining that the selected at least one other extent has another instance of it stored in a third failure domain distinct from both of the two or more distinct failure domains;
- generating, at the first one of the two or more distinct failure domains, the erasure code from the instance of the first extent and the instance of the at least one other extent;
- deleting, from the first one of the two or more distinct failure domains, the instance of the first extent and the instance of the at least one other extent after the erasure code is generated; and
- retaining, on the first one of the two or more distinct failure domains, the erasure code in place of the deleted instance of the first extent and the deleted instance of the at least one other extent;
- wherein any one of the first extent and the at least one other extent can be regenerated on the first one of the two or more distinct failure domains from the generated erasure code and the others of the first extent and the at least one other extent as obtained from the distinct failure domains or the third failure domain.

10. The method of claim 9, wherein the generating the erasure code from the instance of the first extent and the instance of the at least one other extent comprises generating the erasure code, at the first one of the two or more distinct failure domains, by XORing the instance of the first extent and the instance of the at least one other extent.

11. The method of claim 9, further comprising the steps of:
- receiving a request for the first extent;
- identifying, after the deleting after the erasure code generation, all of the at least one other extent that were pressed into the erasure code;
- requesting the identified extents from locations where instances of the identified extents are stored in an unencoded form;
- receiving, in response to the requesting, instances of the identified extents in the unencoded form; and
- generating an instance of the first extent from the erasure code and the received instances of the identified extents in the unencoded form.

12. A redundant data storage system comprising:
- a first failure domain comprising a first instance of a first extent and a first instance of a second extent;
- a second failure domain, different from the first failure domain, the second failure domain comprising a second instance of the first extent;
- a third failure domain, different from both the first failure domain and the second failure domain, the third failure domain comprising a second instance of the second extent; and
- a first set of one or more processing units executing computer-executable instructions, the execution of the computer-executable instructions causing the first set of the one or more processing units to perform steps comprising:
- generating a first erasure code at the first failure domain from extents comprising the first instance of the first extent and the first instance of the second extent;
- deleting the first instance of the first extent and the first instance of the second extent from the first failure domain after the first erasure code is generated; and
- retaining, on the first failure domain, the erasure code in place of the deleted first instance of the first extent and the deleted first instance of the second extent;
- wherein any one of the selected two or more extents can be regenerated on the first failure domain from the generated erasure code and the others of the selected two or more extents as obtained from the second and third failure domains.

13. The redundant data storage system of claim 12, further comprising:
- a fourth failure domain, different from each of the first, second and third failure domains, the fourth failure domain comprising: a third instance of the first extent and a third instance of the second extent; and
- a second set of one or more processing units executing computer-executable instructions, the execution of the computer-executable instructions causing the second set of the one or more processing units to perform steps comprising:
- generating a second erasure code at the fourth failure domain from the third instance of the first extent and the third instance of the second extent; and
- deleting the third instance of the first extent and the third instance of the second extent from the fourth failure domain after the erasure code is generated.

14. The redundant data storage system of claim 12, wherein the first and second extents are of equivalent size.

15. The redundant data storage system of claim 12, wherein a content of the first extent is determined to have a probability of being requested equivalent to that of a content of the second extent.

16. The redundant data storage system of claim 12, wherein the first, second and third failure domains each comprise distinct portions of a single data center that minimize a sharing of any common infrastructure.

17. The redundant data storage system of claim 12, wherein the first, second and third failure domains each comprise distinct storage media.

18. The redundant data storage system of claim 12, wherein the first set of one or more processing units executes further computer-executable instructions, the execution of the further computer-executable instructions causing the first set of the one or more processing units to perform steps comprising:
- receiving, after the deleting after the erasure code generation, a request for the first extent;
- requesting a third instance of the second extent from the third failure domain; and
- generating a third instance of the first extent from the first erasure code and the third instance of the second extent.

19. The redundant data storage system of claim 18, further comprising:
- a fourth failure domain, different from each of the first, second and third failure domains, the fourth failure domain comprising: a second erasure code generated from the second extent and a third extent, differing from the first extent and the second extent; and
- a second set of one or more processing units executing computer-executable instructions, the execution of the computer-executable instructions causing the second set of the one or more processing units to perform steps comprising:
- requesting the third extent from a location where an instance of the third extent is stored in an unencoded form; and
- generating a third copy of the second extent from the second erasure code and received instances of the other extents in the unencoded form.

20. The redundant data storage system of claim 12, further comprising one or more name servers maintaining a location of the first erasure code and each of the instances of the first extent and the second extent.

* * * * *